(12) United States Patent
Knowles

(10) Patent No.: US 8,028,880 B2
(45) Date of Patent: Oct. 4, 2011

(54) SUPPORT APPARATUS

(75) Inventor: Michael Knowles, Los Angeles, CA (US)

(73) Assignees: Michael Knowles, Los Angeles, CA (US); Kathy Huynh, New York, NY (US)

( * ) Notice: Subject to any disclaimer, the term of this patent is extended or adjusted under 35 U.S.C. 154(b) by 498 days.

(21) Appl. No.: 12/172,065

(22) Filed: Jul. 11, 2008

(65) Prior Publication Data

US 2010/0006611 A1   Jan. 14, 2010

(51) Int. Cl.
  *B65D 25/10* (2006.01)
  *A45F 3/08* (2006.01)
  *A47F 5/00* (2006.01)

(52) U.S. Cl. ......... 224/637; 224/242; 224/262; 248/351

(58) Field of Classification Search .................. 224/637, 224/242, 262; 248/351
See application file for complete search history.

(56) References Cited

U.S. PATENT DOCUMENTS

| | | | | |
|---|---|---|---|---|
| 2,676,207 A * | 4/1954 | Hunt | | 381/75 |
| 3,140,800 A * | 7/1964 | Henderson | | 222/174 |
| 3,305,148 A | 2/1967 | Zimmerman | | |
| 3,767,095 A | 10/1973 | Jones | | |
| 3,900,140 A * | 8/1975 | Kelso et al. | | 224/185 |
| 3,964,182 A * | 6/1976 | Pomeret et al. | | 37/466 |
| 4,037,763 A * | 7/1977 | Turchen | | 224/153 |
| 4,206,983 A * | 6/1980 | Nettman et al. | | 352/243 |
| 4,483,070 A * | 11/1984 | Junkermann | | 30/296.1 |
| 4,604,668 A | 8/1986 | Lemelson | | |
| 4,644,654 A * | 2/1987 | Howe et al. | | 30/296.1 |
| 4,774,589 A | 9/1988 | Rowland | | |
| 4,819,101 A | 4/1989 | Lemelson | | |
| 5,065,249 A | 11/1991 | Horn et al. | | |
| 5,626,270 A * | 5/1997 | Tseng | | 224/148.7 |
| 5,934,529 A * | 8/1999 | O'Brien | | 224/160 |
| 6,290,111 B1 * | 9/2001 | Hedenberg et al. | | 224/262 |
| 6,450,377 B1 * | 9/2002 | Oriolo | | 224/266 |
| 6,481,108 B1 * | 11/2002 | Helinski | | 30/296.1 |

FOREIGN PATENT DOCUMENTS

| | | |
|---|---|---|
| GB | 1203250 | 8/1970 |
| JP | 2006119554 | 5/2006 |
| WO | WO 96/15404 | 5/1996 |
| WO | WO 2004/098483 | 11/2004 |

OTHER PUBLICATIONS

Printout of Web page at http://dvinfo.net/articles/camsupport/marzpak.php on May 18, 2008.

(Continued)

*Primary Examiner* — Justin Larson
*Assistant Examiner* — Lester L Vanterpool
(74) *Attorney, Agent, or Firm* — Joseph G. Swan, P.C.

(57) ABSTRACT

Provided are, among other things, apparatuses for supporting a video camera. In one embodiment, the apparatus includes: a harness adapted for wearing on a user's upper body, the harness including a front section which, in use, covers at least a portion of at least one of the user's chest and abdomen, and a rear section which, in use, covers at least a portion of the user's back; and a flexible rod having a proximal end secured to the rear section of the harness and a distal end that extends up above the harness when the flexible rod is unweighted.

20 Claims, 12 Drawing Sheets

OTHER PUBLICATIONS

Printout of Web page at http://www.easyrig.se/easyrig_3_cinema/cinema_index.htm on May 18, 2008.
Printout of Web page at http://www.easyrig.se/ on May 18, 2008.
Easyrig 2.5 manual downloaded on May 18, 2008.
Printout of Web page at http://www.easyrig.se/turtle%20x/turtlex%20index.htm on May 18, 2008.
Steadicam Pilot manual, The Tiffen Comany, downloaded on May 18, 2008.
Steadicam Merlin manual, The Tiffen Comany, downloaded on May 18, 2008.
Steadicam Flyer-LE.manual, The Tiffen Comany, downloaded on May 18, 2008.
Steadicam Clipper manual, The Tiffen Comany, downloaded on May 18, 2008.
Steadicam Archer manual, The Tiffen Comany, downloaded on May 18, 2008.
Steadicam Archer SE manual, The Tiffen Comany, downloaded on May 18, 2008.
Printout of Web page at http://www.cs.cmu.edu/~johnny/steadycam/ on May 18, 2008.
Printout of Web page at http://www.brighteyefilms.com/MachoBrighteyes.html on May 18, 2008.
Printout of Web page at http://www.bassonsteady.com.ar/shop/categorias.asp?id=1 on May 18, 2008.
Printout of Web page at http://actionproducts.ch/en/gallery/47.html on May 18, 2008.
Printout of Web page at http://actionproducts.ch/en/gallery/36.html on May 18, 2008.
Printout of Web page at http://homebuiltstabilizers.com/greycommercial.htm on May 18, 2008.
Printout of Web page at http://www.walterklassen.com/suspender/index.html on May 18, 2008.
Printout of Web page at http://www.b-roll.net/products/easyrig2.html on May 18, 2008.

* cited by examiner

SUPPORT APPARATUS

FIELD OF THE INVENTION

The present invention pertains to support apparatuses, e.g., a portable apparatuses for supporting a video camera during video recording, and is applicable, e.g., to portable support apparatuses that can be worn by a user.

BACKGROUND

It often is the case that a video camera operator needs or wants to hand carry his or her video camera, e.g., to obtain a certain shooting style in a movie, to capture news on location, because the situation otherwise demands flexible mobility, or simply because setting up dollies or other camera gear would be cost-prohibitive or overly time-intensive. For example, independent movies often are shot entirely or almost entirely using a handheld video camera.

Unfortunately, shooting video in this manner has several drawbacks. First, it often is difficult to obtain smooth camera motion when the camera is being carried and manipulated by hand. Second, particularly with respect to professional video work, the cameras often are large, making it difficult and strenuous to shoot in this manner for a long period of time.

Several conventional systems have been proposed for addressing one or both of these problems. However, the present inventor has discovered that each such conventional system has problems and/or shortcomings associated with it, including, e.g., high costs and/or inability to adequately address one or both of the foregoing problems.

SUMMARY OF THE INVENTION

The present invention addresses this need by providing apparatuses that, in their various embodiments, often are able to significantly reduce the strain imposed on the camera operator while simultaneously stabilizing the camera, even when the operator is moving around, walking or even running.

One embodiment of the invention is directed to an apparatus for supporting a video camera, in which the apparatus includes: a harness adapted for wearing on a user's upper body, the harness including a front section which, in use, covers at least a portion of at least one of the user's chest and abdomen, and a rear section which, in use, covers at least a portion of the user's back; and a flexible rod having a proximal end secured to the rear section of the harness and a distal end that extends up above the harness when the flexible rod is unweighted.

By virtue of the foregoing arrangement, it often is possible, e.g., to shift the weight of a camera supported by the flexible rod, together with anything attached to the camera, to the front of the user's waist. In addition, in certain implementations, by sliding the flexible rod into a rigid PVC pipe which, in turn, is slid into a tunnel casing on the harness, the weight of the camera often can be transferred to the opposite end of the flexible rod and then transferred even further, through the configuration of the harness, e.g. by using a sturdy double-belt harness, to the user's midsection. Often, the result is that most of the weight of the camera ultimately is transferred to the user's waist, pushing toward the user's back and, in effect, taking the normal vertical pull of gravity on the camera and shifting it to horizontal pressure on the user's waist.

Still further, as the user walks or runs, the flexible rod often can absorb the shock of the steps and, because the user's arms and shoulders typically do not need to support most of the camera's weight, the impact of the user's steps typically is not transferred to the camera through the user's arms. Not only can such an apparatus often take strain and pressure off of the user's arms and shoulders, but it also often can reduce the strain and pressure on the user's legs, allowing the user to shoot for longer periods of time without getting tired.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
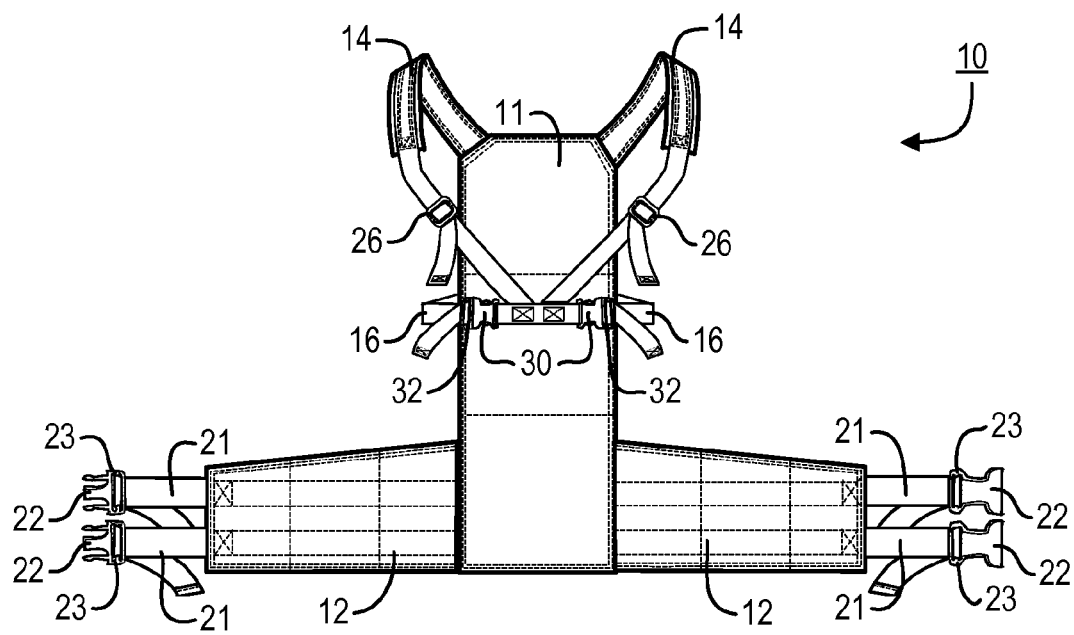
FIG. 1 is a front elevational view of a harness.

FIG. 1 is a front elevational view of a harness 10 according to a representative embodiment of the present invention. In the present embodiment, harness 10 includes a central back panel 11 and a portion 12 that that attaches to back panel 11 (e.g., at or near the bottom of back panel 11) and is used for wrapping around the user's waist and/or abdomen. Harness 10 also includes straps 14 (preferably padded) that attach to panel 11 (e.g., at or near the top of back panel 11) and go over the user's shoulders when in use, and straps 16 that attach to panel 11 (e.g., at or near the middle of back panel 11) and wrap around the user's chest region when in use. Waist portion 12 is provided with two pairs of outer straps 21 that terminate in two corresponding pairs of plastic attachment mating clips 22; each such attachment clip 22, in turn, includes parallel slots 23 through which outer straps 21 are looped in order to provide length adjustment of straps 21. Similarly, shoulder straps 14 loop through slider components 26, so as to make shoulder straps 14 length-adjustable. Chest straps 16 preferably are provided with plastic attachment mating clips 30 that include parallel slots 32 through which straps 16 are looped so as to make straps 16 length-adjustable.

Such length-adjustable straps 14, 16 and 21 preferably can allow harness 10 to be flexibly secured to the user's body, e.g., so as to shift the weight of the overall support apparatus in a desired manner. When harness 10 is in use, straps 14, 16 and 21 form at least part of the front section of harness 10, covering at least a portion of the user's chest and/or abdomen, and back panel 11 forms a least a part of the rear section of harness 10, covering at least a portion of the user's back.

In the preferred embodiments, harness 10 is made entirely or almost entirely of fabric material, such as nylon. In certain embodiments, one or more of the components making up a harness 10 (e.g., some or all of straps 14, 16 and 21) have some elasticity, e.g., so as to better accommodate different kinds of movements that the user might want to make. It is noted that the term "fabric material" is used herein in its ordinary sense, i.e., to refer to a material that generally resembles cloth or that has the general properties of cloth, particular with respect to pliability and ability to be folded.

Figure 2:
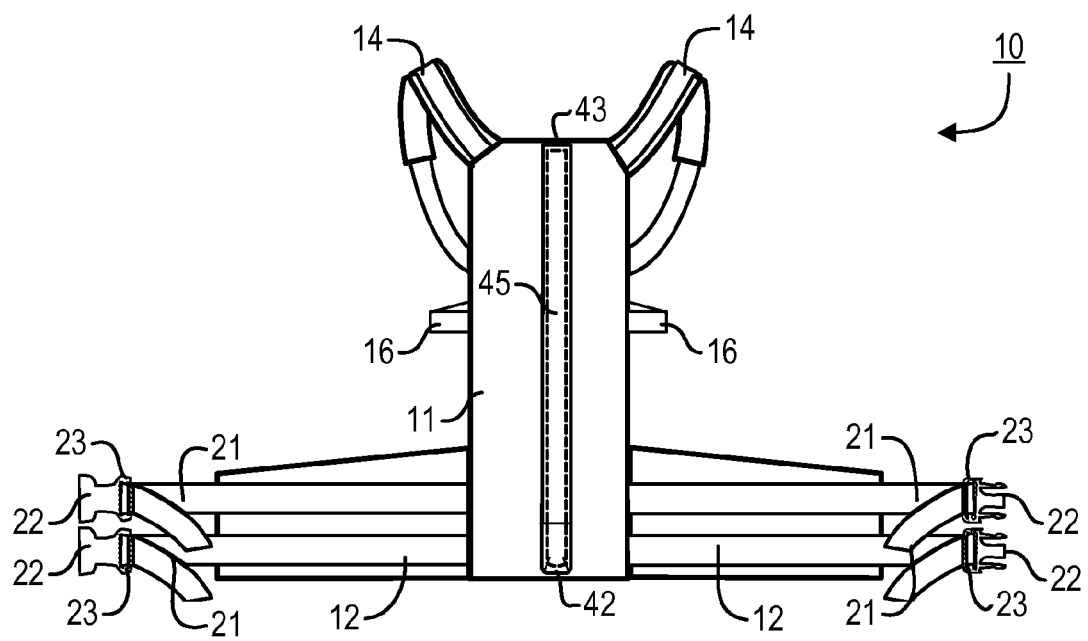
FIG. 2 is a rear elevational view of a harness.
Figure 3:
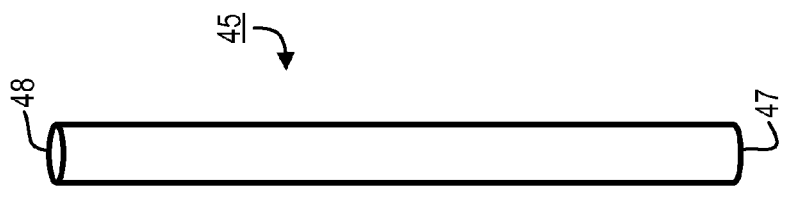
FIG. 3 is a perspective view of a tube-shaped inner receptacle.

FIG. 2 is a rear elevational view of harness 10. As shown, in the present embodiment the rear side of central back panel 11 includes an elongated pocket 40, which has a closed bottom 42 and an open top 43, and which functions as an outer receptacle in the present embodiment. Disposed within elongated pocket 40 in this embodiment is an inner receptacle 45. Preferably, inner receptacle 45 is tube-shaped (e.g., as shown in FIG. 3, with an open bottom 47 and an open top 48. In addition, inner receptacle 45 preferably is made of polyvinyl chloride (PVC), e.g., clear semi-flexible PVC. However, it should be noted that in alternate embodiments, inner receptacle 45 can have other shapes, can have a closed bottom and/or can be made of any other material (e.g., any other plastic or polymer). In the preferred embodiments, inner receptacle 45 is somewhat flexible (e.g., a clear, partially flexible PVC tube or pipe), with the flexibility allowing inner receptacle 45 to bend and thereby at least partially followed the contour of the user's back. However, in alternate embodiments inner receptacle 45 instead is rigid (e.g., a rigid PVC pipe).

Inner receptacle 45 may be loosely held within elongated pocket 40 so that it can be easily inserted or removed, tightly held within elongated pocket 40 in order to prevent inadvertent removal while still permitting removal when desired, or even substantially permanently attached to elongated pocket 40. Still further, inner receptacle 45 may be omitted entirely, e.g., using elongated pocket 40 as the sole receptacle. In alternate embodiments, elongated pocket 40 is omitted, with a rigid or at least partially flexible receptacle (e.g., having any of the configurations described above for inner receptacle 45) serving as the sole receptacle for harness 10; in this embodiment, the receptacle can be attached to harness 10 in any of a variety of different ways (e.g., using a short pocket on the bottom to support its bottom end and one or more fabric loops disposed along its length to stabilize its position). In a further alternate embodiment, such a short pocket, with or without one or more guide loops, may alone be used as the receptacle.

Irrespective of the form of the receptacle, preferably at least one is provided at the rear side of harness 10, and that receptacle preferably has a length of at least 10-24 inches (e.g., at least 18 inches), although as indicated in the foregoing example in which fabric loops are used, that length need not involve any continuous element. Rather, it is merely preferable that the provided receptacle is capable of providing support for a flexible rod 60 (discussed below) along the indicated minimum preferred length.

In any event, the purpose of the provided receptacle (which sometimes is referred to herein as receptacle 45, with no loss of generality intended, but merely to simplify the present discussion by referring to the exemplary embodiment discussed above) is to support a flexible rod 60 (again, discussed below, the purpose of which also being discussed below). In the embodiments in which the provided receptacle is open, and otherwise configured so as to allow the flexible rod 60 to be readily inserted and withdrawn (e.g., in terms of cross-section shape and size), the receptacle preferably has an inner width (or diameter) that is just slightly larger than the outer width (or diameter) of the flexible rod 60 (e.g., ⅜ inch PVC pipe for a 0.350 inch diameter flexible rod 60 or ½ inch PVC pipe for a 0.440 inch diameter flexible rod 60). In either case, flexible rod 60 preferably can be slid into and out of the provided elongated receptacle.

In the preferred embodiments, the provided receptacle is more rigid than flexible rod 60, thereby provided additional support for rod 60. However, in alternate embodiments, the mere combination of the provided receptacle and rod 60 is sufficient to provide the desired rigidity along the length where rod 60 is inserted into the provided receptacle. This effect often can be enhanced by appropriately shaping the cross-sections of rod 60 and of the interior space of the provided receptacle.

Figure 4:
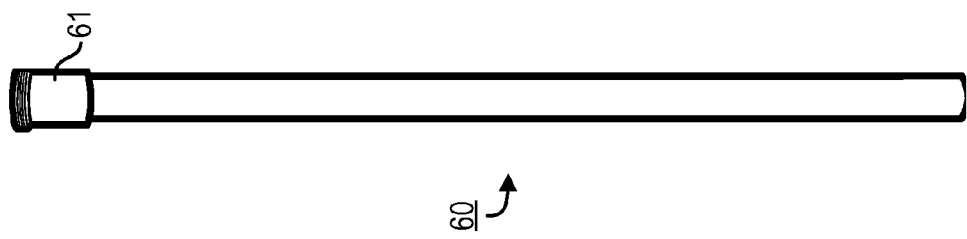
FIG. 4 is a front elevational view of a flexible rod.

FIG. 4 is a front elevational view of an exemplary flexible rod 60. As used herein, the adjective "flexible" means that rod 60 can be bent by pressure, but then returns substantially to its original shape when the pressure (or force) is released.

Preferably rod 60 is made of fiberglass, is approximately 38-48 inches long (more preferably, approximately 43 inches long), and is approximately 0.3-0.5 inch wide (e.g. in diameter for a rod 60 having a circular cross-section, as is preferred). More preferably, different widths are used for different expected weights to be accommodated (as discussed in more detail below). In one representative embodiment, a width of 0.350 inch is used for weights of 5-15 pounds and a width of 0.440 inch is used for weights of 15-25 pounds. However, the preferred widths will vary if a material other than fiberglass is used, if rod 60 has a different length, if a shorter attachment mechanism 90 (discussed below) is used (so it is desirable for rod 60 to bend further downwardly), and/or if any other characteristics or design parameters change.

The present embodiments use one of the chimney-sweep fiberglass rods currently made by Rutland™ as flexible rod 60. Such rods are available in the 0.350 inch and 0.440 inch diameter sizes mentioned above. As shown in FIG. 4, each such Rutland™ flexible rod 60 is provided with a male threaded component 61 on its distal end.

Figure 6:
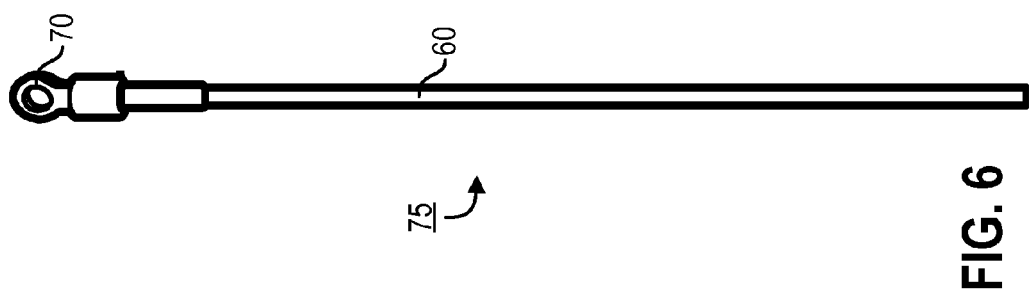
FIG. 6 is a front elevational view of a rod with a pull ring attached.
Figure 5:
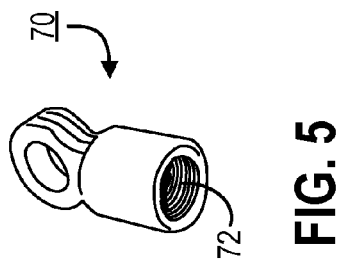
FIG. 5 is a perspective view of a pull ring.

A plastic pull ring 70 (also available from Rutland™, e.g., as illustrated in FIG. 5), having a female threaded section 72, preferably is screwed onto (or otherwise attached to rod 60, resulting in a rod assembly 75, e.g., as shown in FIG. 6. As discussed in more detail below, the purpose of pull ring 70 is to serve as an attachment mechanism, and although presently preferred, in alternate embodiments a different kind of attachment mechanism instead is used and/or the attachment mechanism can be integrally formed with, or otherwise permanently attached to, rod 60.

It is noted that in the present embodiment, flexible rod 60 is a solid rod. However, in alternate embodiments rod 60 instead is hollow, e.g., in the nature of a tube or pipe.

Figure 7:
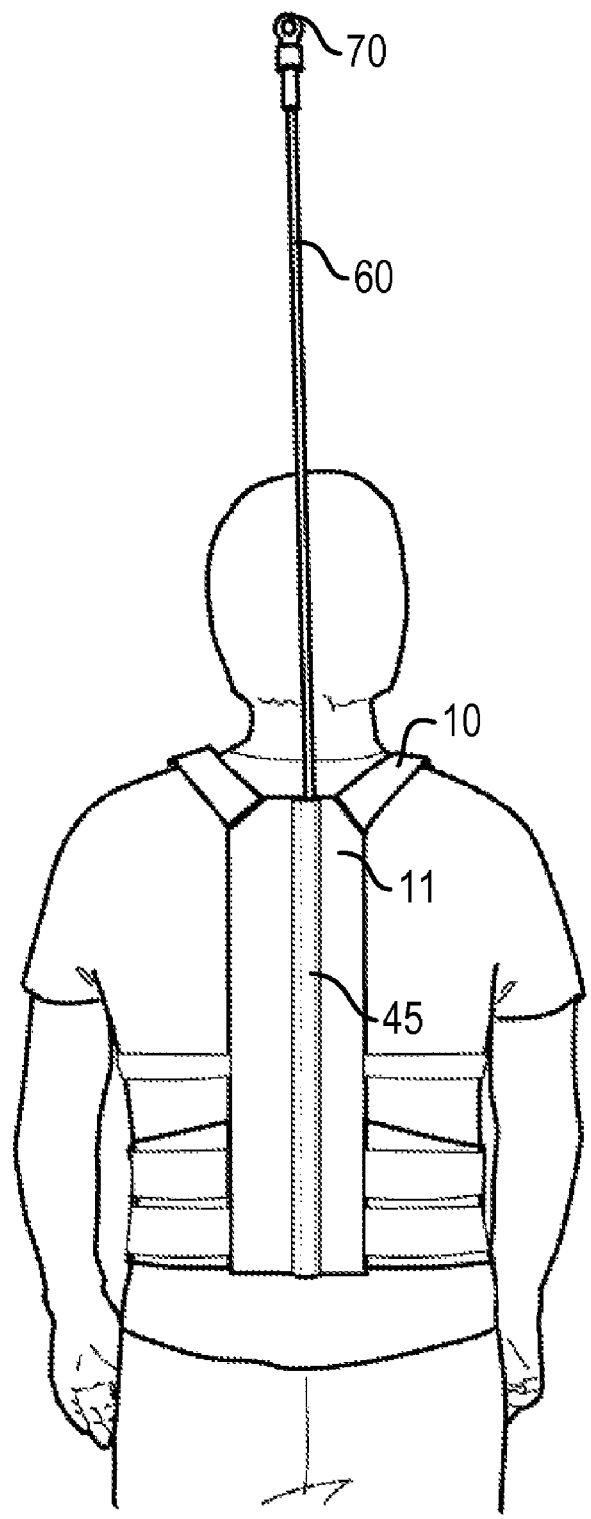
FIG. 7 is a rear elevational view of a harness and unweighted rod assembly in use.
Figure 8:
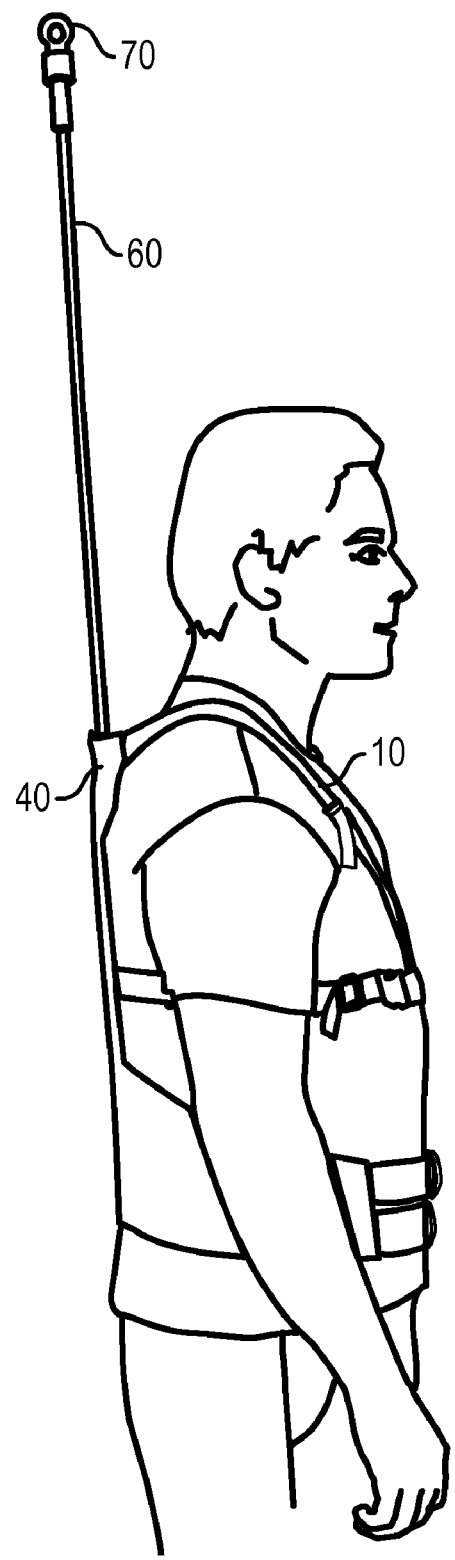
FIG. 8 is a right side elevational view of a harness and unweighted rod assembly in use.

In any event, rod 60 (or rod assembly 75) preferably is slid into inner receptacle 45 (which, in the present embodiment, is encased in elongated pocket 40) or otherwise secured to the rear of harness 10, e.g., with the result illustrated in FIGS. 7 and 8. As shown, in the present embodiment rod assembly 75 extends straight up in its natural (unweighted) state. In alternate embodiments, a rod 60 that has a natural curve or bow instead is used, e.g., so that rod 60 extends forward somewhat, e.g., in order to facilitate access to the distal end of rod 60 (e.g., to pull ring 70).

By allowing rod 60 to simply slide in and out of inner receptacle 45, it is relatively easy to replace rod 60, e.g., with one having a different diameter so as to accommodate different weights. However, in alternate embodiments, rod 60 is more fixedly attached to harness 10. For example, rod 60 may be provided with one or more spring-loaded pins and inner receptacle 45 provided with one or more corresponding holes, so that when rod 60 initially is inserted into inner receptacle 45 such pin(s) are compressed or retracted; then, the pin(s) project into the hole(s) upon encountering them, thereby locking rod 60 into inner receptacle 45. Alternatively, rod 60 may be attached to harness 10 using a compression fit or even may be substantially permanently attached to harness 10.

In any event, in the preferred embodiments, rod 60 (or rod assembly 75) has a proximal end secured to the rear section of the harness 10 and a distal end that extends up above the harness 10 when the flexible rod 60 is unweighted, e.g., as shown in FIGS. 7 and 8.

Figure 9:
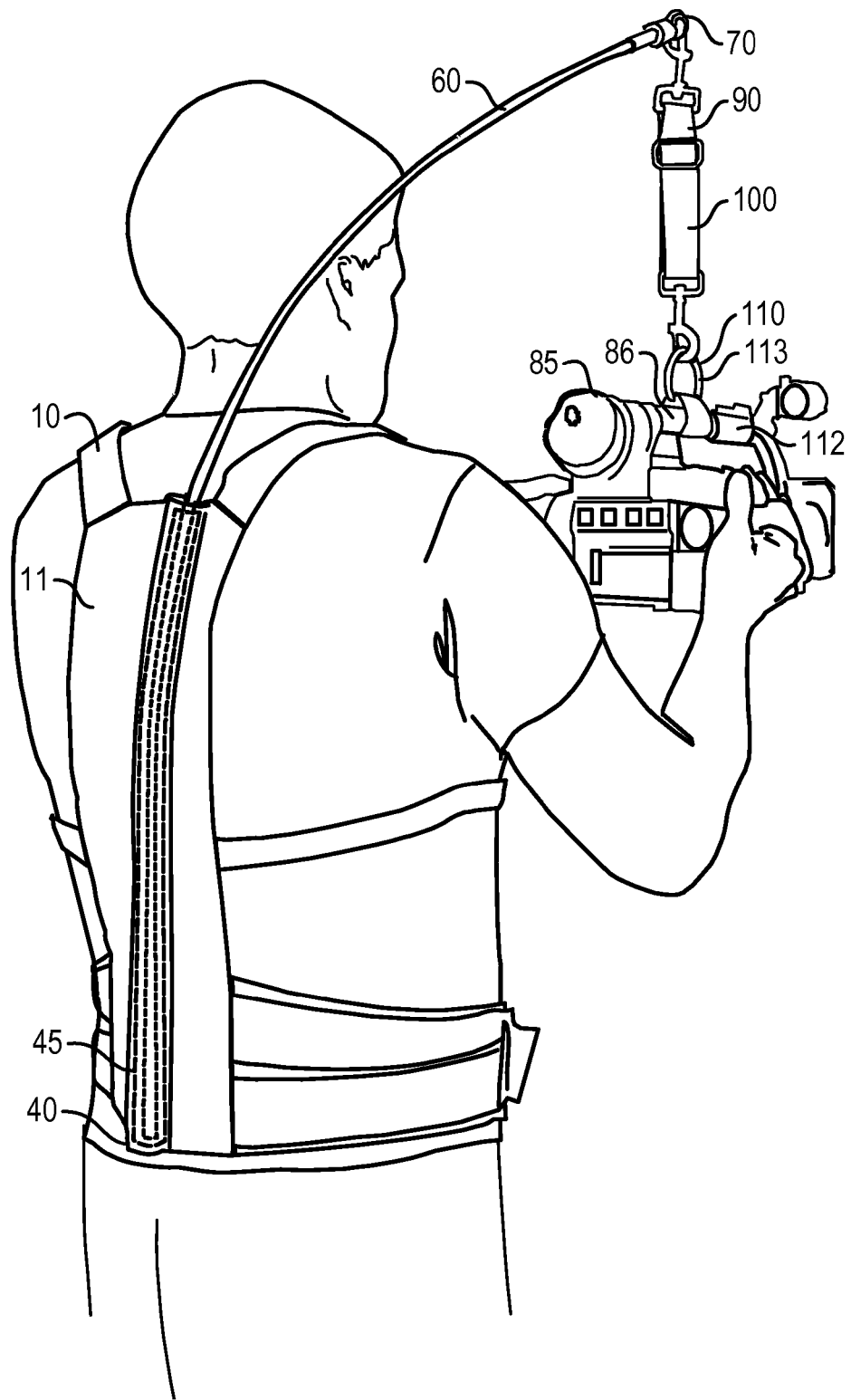
FIG. 9 is a rear perspective view of a support assembly in use supporting a video camera.
Figure 10:
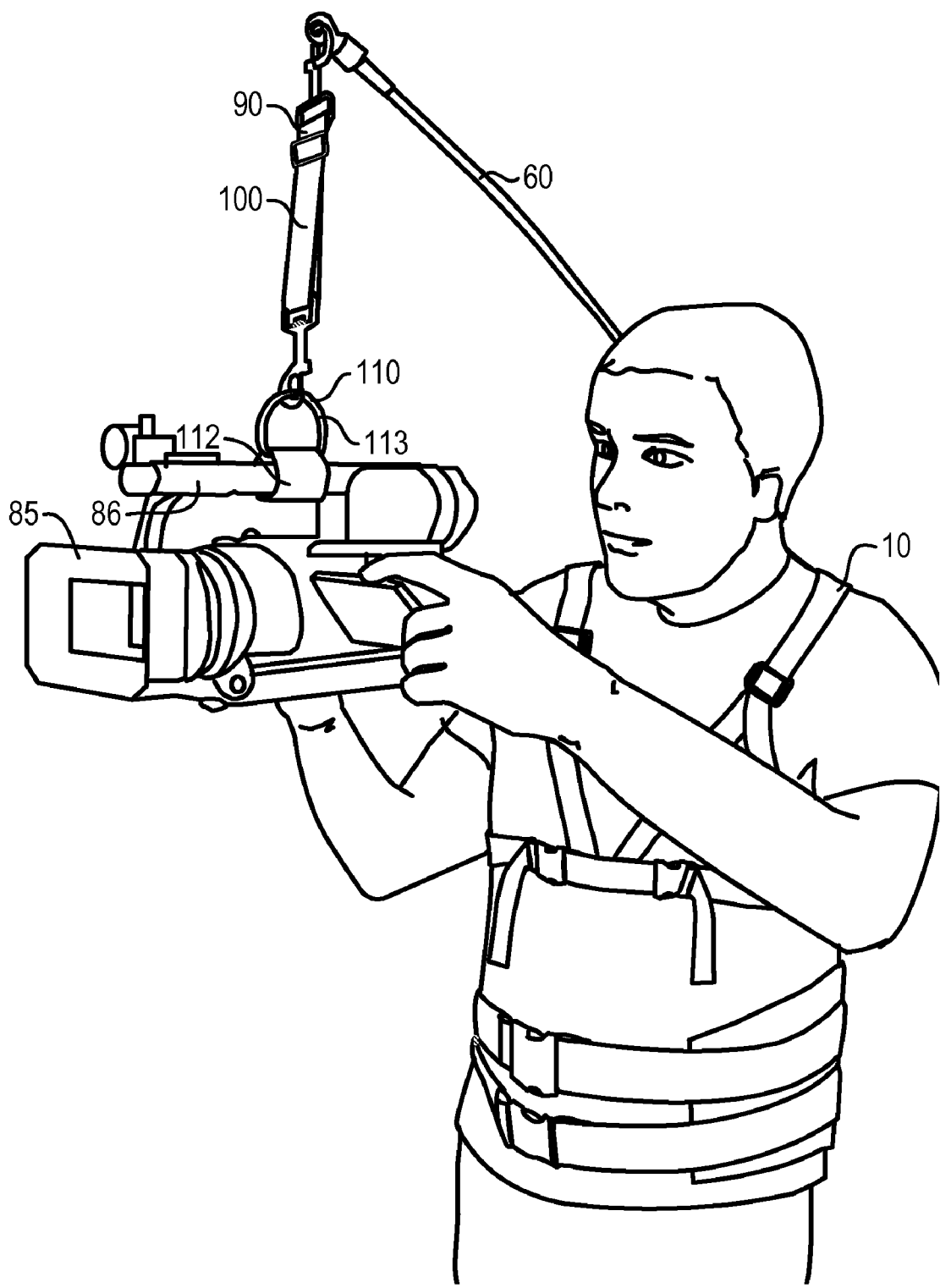
FIG. 10 is a front perspective view of a support assembly in use supporting a video camera.
Figure 11:
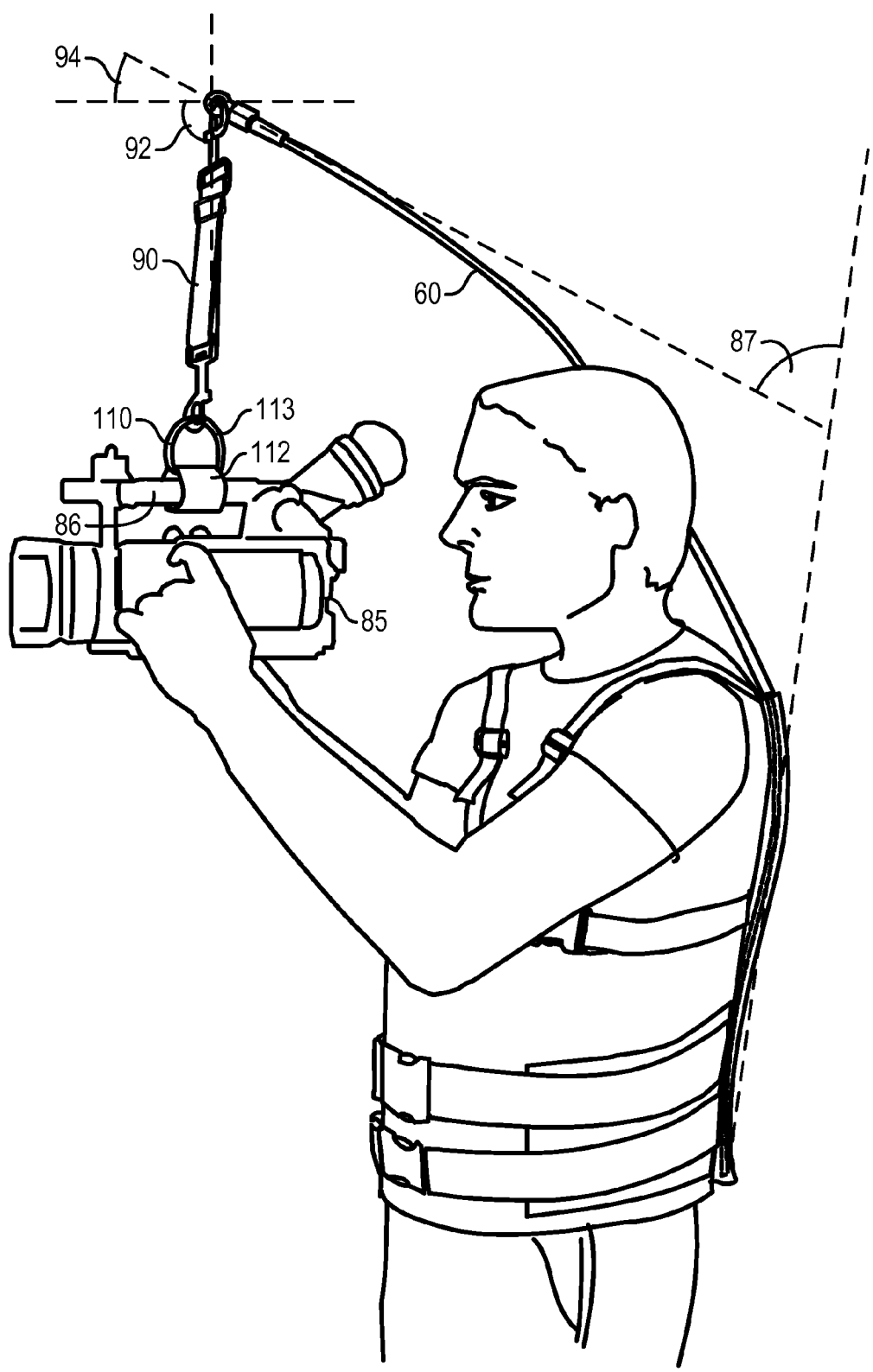
FIG. 11 is a side of elevational view of a support assembly in use supporting a video camera.

As shown in FIGS. 9-11, an attachment mechanism 90 preferably is disposed at the distal end of flexible rod 60. Accordingly, with flexible rod 60 extending from the rear section of harness 10, or potentially even prior to insertion of rod 60 into the corresponding receptacle in the rear section of harness 10, a video camera 85 (or other device or object) is attached so as to be suspended from the distal end of flexible rod 60, using attachment mechanism 90. In the present embodiment, attachment mechanism 90 is secured to a horizontally extending member 86 on video camera 85. Such horizontally extending member 86 can be, e.g., a rigid handle (as shown in FIGS. 9-11) or a pliable carrying strap.

As further shown in FIGS. 9-11, the weight of video camera 85 causes flexible rod 60 to bend forward over the user's shoulder. In the preferred embodiments, flexible rod 60 is configured, e.g., in terms of material, width and length, so as to bend forward at least 20-45° when an object of the desired weight range is suspended from the flexible rod 60 in this manner. In some cases, flexible rod 60 is configured to bend even more, such as a minimum of anywhere from 45-90°. Preferably, such angles are measured as the angular change in the tangent between the proximal and distal ends of flexible rod 60. Thus, with an initially straight flexible rod 60 (having a 0° angle), the bend angle 87 in the current example is shown in FIG. 11.

In the preferred embodiments, attachment mechanism 90 is substantially inelastic relative to the flexible rod 60, so that all or nearly all of the elasticity is provided by rod 60. Also, attachment mechanism 90 preferably is elongated (e.g., at least six inches long), pliable and, in its equilibrium state (e.g., with video camera 85 hanging straight down), extends at an angle 92 (shown in FIG. 11) of greater than 90° from the distal end of the flexible rod 60. For purposes of this last property, it is preferable that the distal end of flexible rod 60, when weighted, forms an angle 94 with the horizontal that is greater than 0°.

More preferably, the attachment mechanism 90 is detachable from flexible rod 60 and includes a two-piece strap assembly. An upper length-adjustable strap assembly 100 has a top end that attaches to the distal end of the rod assembly 75 (e.g., to pull ring 70) and a bottom end that detachably attaches to the top end of the lower strap assembly 110. The bottom end of the lower strap assembly 110, in turn, attaches to video camera 85. Accordingly, in order to attach the video camera to the support assembly according to the present invention, the upper strap assembly 100, which preferably already is attached to pull ring 70, preferably is grasped, pulled down and attached to lower strap assembly 110, which previously has been attached to video camera 85.

Suspension of the video camera 85 results in an equilibrium state in which flexible rod 60 has a particular bend, with the weight of the camera 85 precisely offset by the forces exerted by flexible rod 60. At the same time, due to the flexibility of rod 60, video camera 85 usually can be easily as manipulated in any direction, e.g., with only minimal force. In other words, video camera 85 essentially floats freely in a position in front of the user. This floating effect is achieved in substantial part through the use of flexible rod 60 which allows movement of the video camera 85 in any direction with similar amounts of force, as compared to conventional systems that use a rigid structure and provide only vertical support. At the same time, because flexible rod 60 (and, in fact the entire support assembly, which includes harness 10, flexible rod 60 and attachment and 90) supports the video camera 85 only from its top end, the user generally is free to otherwise manipulate video camera 85 in the conventional manner.

Such a multi-dimensional floating effect not only provides improved maneuverability, but typically also results in greater isolation from external movement and vibration, particularly the movements of the user. Consequently, steadier camera movement often is obtained.

Still further, because the rod 60 is flexible, the weight of video camera 85 tends to be transferred horizontally, meaning the weight pulling down is transferred to the proximal end of the rod 60 as pressure pushing out and away from the user's lower back. Such outward pressure then can be transferred around the user's waist via the belt system of harness 10, so most of the pressure actually is felt on the user's belly or on the front side of the user's waist, pushing back, not down. The result often is significantly less strain on the user's lower back.

As shown in FIGS. 9-11, lower strap assembly 110 can be implemented, e.g., simply as a combination of a strap 112 and a D-shaped ring 113 (or a ring having any other shape). In the preferred embodiment, strap 112 is made of nylon, includes high-density hook-and-loop attachment sections (e.g., as are commonly sold under the brand name Velcro™) and is sewn onto the straight section of D-shaped ring 113 (i.e., permanently attached to ring 113). In alternate embodiments, strap 112 is simply wrapped around ring 113, e.g., together with a horizontally extending member on the video camera 85, or otherwise only temporarily attached to ring 113. Strap 112 preferably can be wrapped in a loop around (e.g., and then, using provided hook-and-loop attachment sections or other attachment components, secured around) a horizontally extending member 86 on the video camera 85. D-shaped ring 113 can be made, e.g., of plastic or metal. Alternatively, e.g., lower strap assembly 110 can have any other configuration for detachably attaching to the top end of a video camera.

Figure 12:
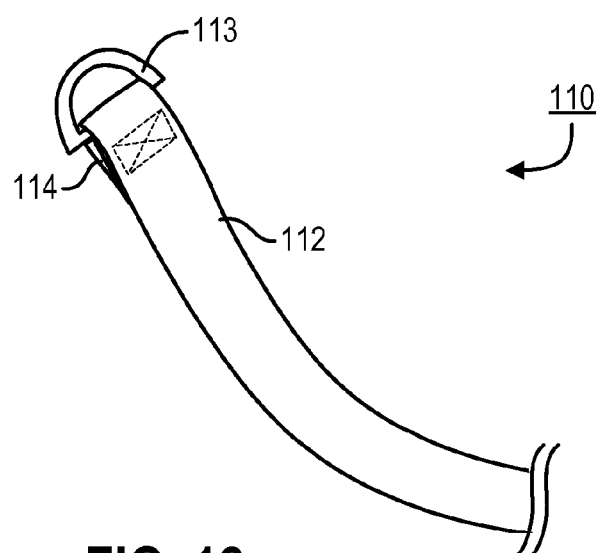
FIG. 12 is a perspective view of a lower strap assembly.

FIG. 12 illustrates lower strap assembly 110, with the strap 112 laid out flat. As shown, strap 112 is sewn into a loop 114 around the straight section of D-shaped ring 113, resulting in a substantially permanent attachment to D-shaped ring 113.

In this embodiment, strap 112 is made of Velcro® brand One Wrap®, which has a nylon high-density loop surface laminated to a polyester high-density hook surface, so that when wrapped into a loop (e.g., around horizontal member 86) the opposite surfaces of strap 112 come into contact with and adhere to each other, thereby providing a secure attachment.

In the foregoing embodiment, lower strap assembly 110 attaches to a horizontal member 86 on the top side of video camera 85 using a fabric loop. In alternate embodiments, such an attachment instead can be made, e.g., using any other pliable loop, using a rigid or semi-rigid loop (e.g., a plastic or metal ring that is capable of opening and closing) or using a rigid or semi-rigid hook (e.g., made of plastic or metal). Still further, the provided attachment mechanism 90 can attach to such a horizontal member 60 using a clamp or by threading or snapping into a mating component that is disposed on such horizontal member 60.

Figure 13:
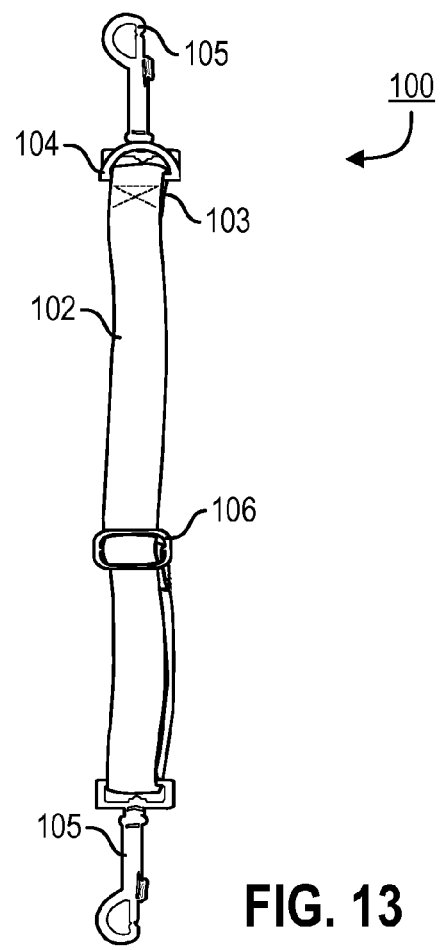
FIG. 13 is a perspective view of an upper strap assembly.

As shown in FIG. 13, upper strap assembly 100 can be implemented as a strap 102 (e.g., made of nylon webbing) that is fixedly attached, e.g., using a sewn loop 103 and D-shaped ring 104, at its top end to a snap hook (or clip) 105 having a spring closure. In addition, strap 102 preferably loops through a length-adjustment slider component 106 and through another such snap hook 105 at its other end. In any event, upper strap assembly 100 preferably detachably attaches to the distal end of rod 60, e.g., using a clip at the distal end of rod 60 and/or at the top end of upper strap assembly 100, and also detachably attaches either directly to a video camera 85 or to a lower strap assembly 110 (or other lower attachment mechanism that in turn attaches to video camera 85), e.g., using a clip on the lower end of upper strap assembly 100 or on such lower attachment mechanism. As indicated above, upper strap assembly 100 preferably has adjustable length.

It should be noted that the particular attachment mechanism 90 described above is merely exemplary, and any other attachment mechanism 90 instead can be used. Preferably, attachment mechanism 90 is configured for attaching to a horizontally extending member 86 on the top side of video camera 85. For this purpose, attachment mechanism 90 preferably includes a hook and/or a loop (e.g., a strap that can be wrapped into a loop) for supporting the video camera 80, e.g., by suspending the video camera 80 from such horizontally extending member.

Figure 14:
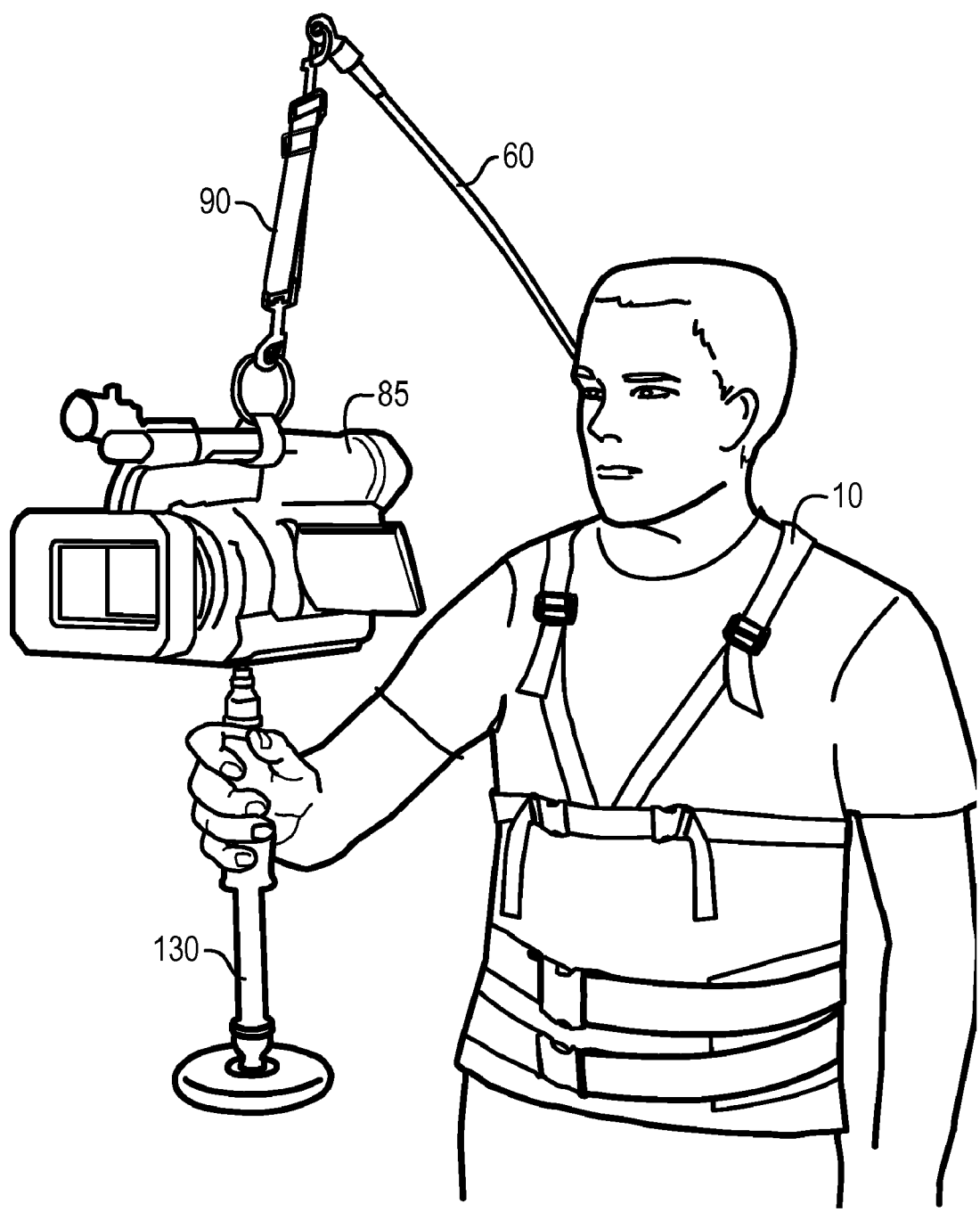
FIG. 14 is a front perspective view of a support assembly and a stabilizing handle assembly in use together.
Figure 15:
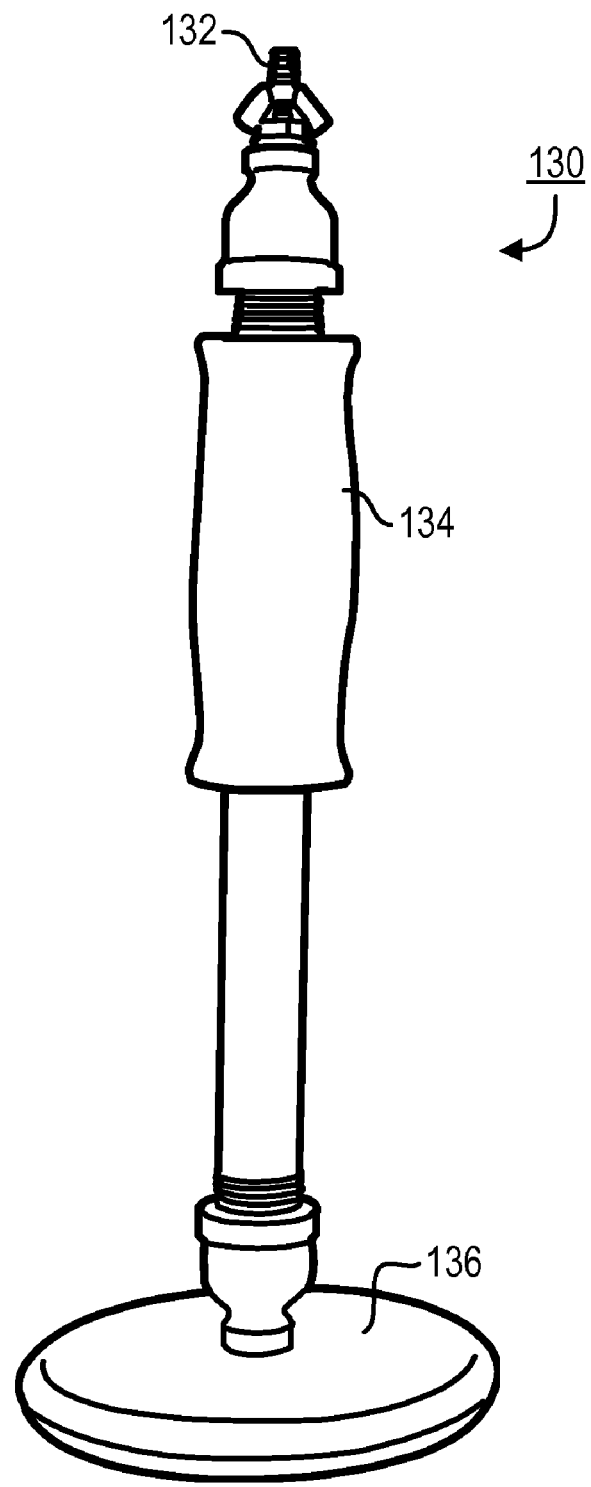
FIG. 15 is a perspective view of a stabilizing handle assembly.

As shown in FIG. 14, a support assembly according to the present invention also can be used with a bottom handle assembly 130 in order to provide additional camera stabilization and/or to change the way the video camera 85 is manipulated. FIG. 15 illustrates one example of a handle assembly 130 in greater detail. An upper male threaded portion 132 screws into a mating female threaded receptacle (into which a tripod stand conventionally is attached) on the bottom of the camera 85. A provided handle 134 (preferably padded and provided with a gripping surface) is adapted for the user to grasp. Finally, a bottom weight 136 (e.g., weighing approximately 2½ pounds) is disposed (e.g., detachably attached, for replacement with different weights) at the bottom of the handle assembly 130. Because handle assembly 130 is grasped at the handle 134, which is located between the video camera 80 and bottom weight 136 (each of which having a significant mass), any tendency of the user's hand to shake, or otherwise move in anything but a smooth matter, is dampened. At the same time, bottom handle assembly 130 increases the amount of weight that must be supported by flexible rod 60, so if such a bottom handle assembly 130 is to be used, its weight preferably is taken into account in selecting the appropriate flexible rod 60 to use.

Figure 16:
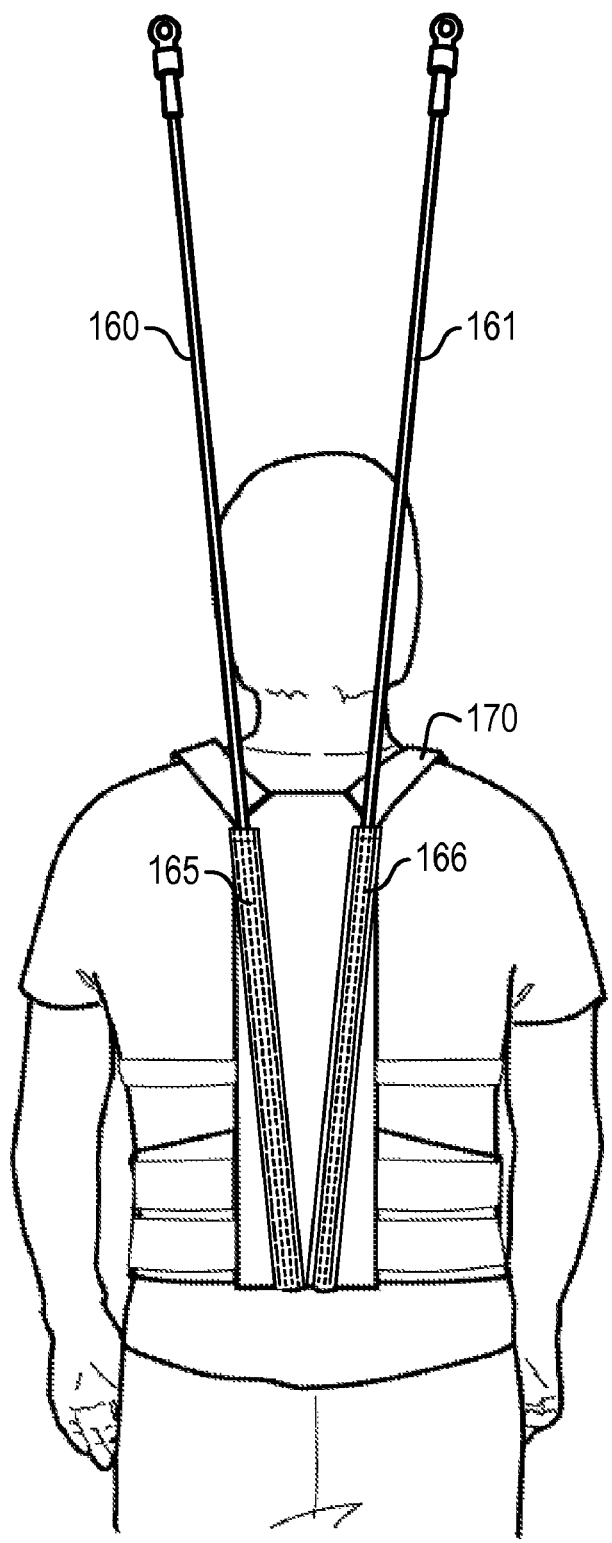
FIG. 16 is a rear elevational view of a harness supporting two unweighted rod assemblies, in use.
Figure 17:
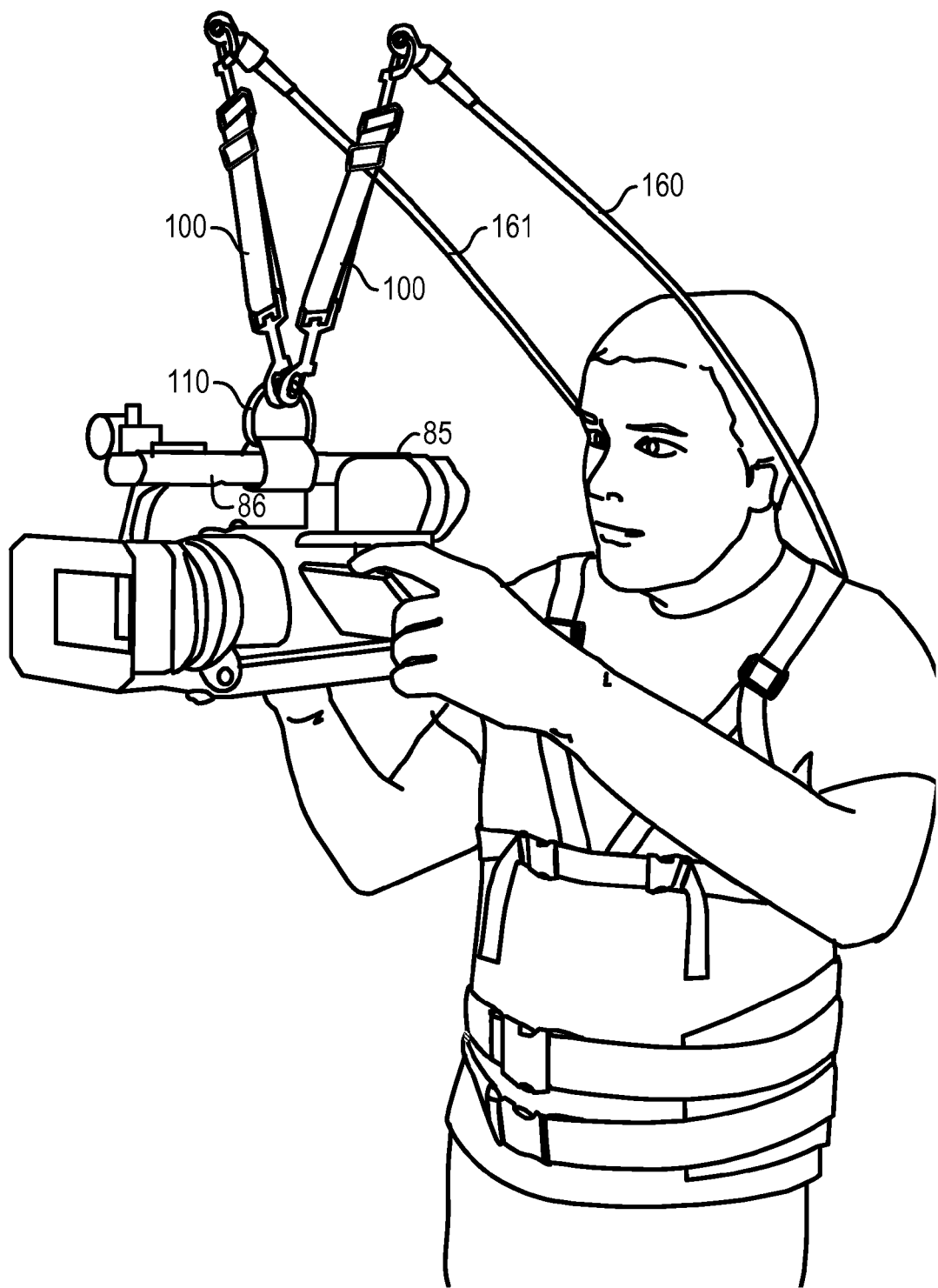
FIG. 17 is a front perspective view of a harness supporting two rod assemblies, in use supporting a video camera.

In the embodiment described above, the support assembly includes a single flexible rod 60 for supporting video camera 85 (which preferably is replaceable with another single rod 60, e.g., for accommodating different weights), with that single flexible rod 60 extending over the user's right or left shoulder (e.g., depending upon whether the user is right-handed or left-handed). In an alternate embodiment, e.g., as illustrated in FIGS. 16 and 17, the support assembly simultaneously uses two flexible rods 160 and 161. For this purpose, as shown in FIG. 16, two receptacles 165 and 166 (e.g., arranged in a "V" shape) are provided in the back of a harness 170, which otherwise may be identical to harness 10, described above. Similarly, flexible rods 160 and 161 may have the configurations described above for flexible rod 60, with the same considerations also applying to flexible rods 160 and 161 (except that each or rods 160 and 161 generally would be required to accommodate only one half of the supported weight), and each of corresponding receptacles 165 and 166 may have any of the configurations described above in connection with the receptacle for flexible rod 60.

As in the above embodiment, each of flexible rods 160 and 161 preferably is substantially straight in its natural (unweighted) state. Then, when a weight such as video camera 85 is suspended from the distal ends of flexible rods 160 and 161, each of such flexible rods 160 and 161 bends forward (in this embodiment, one over each of the user's shoulders), again resulting in the effect that a video camera 85 (or other suspended device or object) tends to float more freely in front of the user. In the present embodiment, an upper strap assembly 100 is provided at the distal end of each of flexible rods 160 and 161 and both upper strap assemblies 100 attached to a single lower strap assembly 110 which, in turn is attached to video camera 85. However, in alternate embodiments an entire attachment mechanism 90 may be provided for each of flexible rods 160 and 161.

ADDITIONAL CONSIDERATIONS

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for supporting a video camera, comprising:
   a harness adapted for wearing on a user's upper body, the harness including: (1) a front section which, in use, covers at least a portion of at least one of the user's chest and abdomen, and (2) a rear section which, in use, covers at least a portion of the user's back;
   a flexible rod having a proximal end secured to the rear section of the harness;
   an attachment mechanism disposed at a distal end of the flexible rod; and
   a video camera,
   wherein the flexible rod has a first position when there is no weight secured to the attachment mechanism and a second position when a weight of 20 pounds is secured to the attachment mechanism,
   wherein in the first position the distal end of the flexible rod extends up above the harness and there is a first angle between the proximal end and the distal end of the flexible rod,
   wherein in the second position there is a second angle, which is at least 20° greater than the first angle, between the proximal end and the distal end of the flexible rod, and
   wherein the attachment mechanism is detachably attached to a top side of the video camera.

2. An apparatus according to claim 1, wherein the attachment mechanism comprises at least one of a hook and a loop for suspending a horizontally oriented member.

3. An apparatus according to claim 1, wherein the attachment mechanism is detachably attached to a horizontally oriented member on the top side of the video camera.

4. An apparatus according to claim 3, further comprising a handle assembly attached to a bottom side of the video camera.

5. An apparatus according to claim 1, wherein the attachment mechanism has adjustable length.

6. An apparatus according to claim 1, wherein the attachment mechanism is at least 6 inches long and, in its equilibrium state, extends at an angle of greater than 90° from the distal end of the flexible rod.

7. An apparatus according to claim 1, wherein the rear section of the harness includes an elongated receptacle into which the proximal end of the flexible rod is inserted.

8. An apparatus according to claim 7, wherein the elongated receptacle is at least 10 inches long.

9. An apparatus according to claim 7, wherein the elongated receptacle is configured such that the flexible rod can be slid into and out of the elongated receptacle.

10. An apparatus according to claim 1, wherein the rear section of the harness includes an elongated pocket enclosing an inner receptacle, and the proximal end of the flexible rod is inserted into the inner receptacle.

11. An apparatus according to claim 1, wherein the flexible rod is made of fiberglass.

12. An apparatus according to claim 1, wherein the flexible rod has a third position when a weight of 10 pounds is secured to the attachment mechanism, and wherein in the third position there is a third angle, which is at least 20° greater than the first angle, between the proximal end and the distal end of the flexible rod.

13. An apparatus according to claim 1, wherein the flexible rod bends forward over the user's shoulder when a weight is attached to the distal end of the flexible rod.

14. An apparatus according to claim 1, wherein the harness includes at least one adjustable strap.

15. An apparatus according to claim 1, wherein the harness includes at least one adjustable strap located in a region around the user's waist and at least one adjustable strap located in a region around the user's chest.

16. An apparatus according to claim 1, further comprising a second flexible rod, which is interchangeable with the flexible rod, for accommodating a different weight range.

17. An apparatus according to claim 1, further comprising a second flexible rod having a proximal end secured to the rear section of the harness, simultaneously with the flexible rod.

18. An apparatus according to claim 1, wherein the flexible rod extends substantially straight up in the first position.

19. An apparatus according to claim 1, wherein the attachment mechanism is elongated and pliable.

20. An apparatus according to claim 1, wherein the attachment mechanism includes a length-adjustable strap.

* * * * *